US005649568A

United States Patent [19]
Allen et al.

[11] Patent Number: 5,649,568
[45] Date of Patent: Jul. 22, 1997

[54] GLASS FIBER REINFORCED CEMENT LINERS FOR PIPELINES AND CASINGS

[75] Inventors: William C. Allen, Pasadena, Calif.; David E. Stikkers, Reno, Nev.; Daniel P. Hoyer, Pasay, Philippines

[73] Assignee: Union Oil Company of California, El Segundo, Calif.

[21] Appl. No.: 401,753

[22] Filed: Mar. 9, 1995

Related U.S. Application Data

[63] Continuation-in-part of Ser. No. 145,064, Oct. 29, 1993, abandoned.

[51] Int. Cl.$^6$ ................................................. F16L 9/14
[52] U.S. Cl. .................... 138/137; 138/175; 138/145; 138/DIG. 6
[58] Field of Search .......................... 138/97, 98, 175, 138/145, 146, 137, DIG. 6; 264/267, 270, 310, 311; 156/287

[56] References Cited

U.S. PATENT DOCUMENTS

| | | | |
|---|---|---|---|
| 3,340,115 | 9/1967 | Rubenstein | 264/270 X |
| 3,354,169 | 11/1967 | Shafer et al. | |
| 4,010,936 | 3/1977 | Takashima | 266/45 |
| 4,115,135 | 9/1978 | Goeman | 106/99 |
| 4,144,121 | 3/1979 | Otouma et al. | 162/145 |
| 4,150,176 | 4/1979 | Beckers | 264/270 X |
| 4,150,189 | 4/1979 | Pusch | 428/358 |
| 4,261,757 | 4/1981 | Mathieu | 106/110 |
| 4,306,911 | 12/1981 | Gordon et al. | 106/99 |
| 4,363,666 | 12/1982 | Johnson et al. | 106/90 |
| 4,369,066 | 1/1983 | Artois et al. | 106/98 |
| 4,373,957 | 2/1983 | Pedersen | 106/93 |
| 4,515,861 | 5/1985 | Arup | 428/450 |
| 4,534,796 | 8/1985 | Massol | 106/99 |
| 4,588,443 | 5/1986 | Bache | 106/97 |
| 4,619,702 | 10/1986 | Gartner | 106/89 |
| 4,979,992 | 12/1990 | Bache | 106/644 |
| 4,992,395 | 2/1991 | Dulberg et al. | 501/95 |
| 5,030,282 | 7/1991 | Matsuhashi et al. | 106/692 |
| 5,108,679 | 4/1992 | Rirsch et al. | 264/118 |
| 5,122,554 | 6/1992 | Allen | 524/8 |
| 5,176,869 | 1/1993 | Okamoto et al. | 138/146 X |
| 5,525,155 | 6/1996 | Allen | 138/145 X |

FOREIGN PATENT DOCUMENTS

| | | |
|---|---|---|
| 2351346 | 12/1977 | France . |
| 3041973 | 8/1982 | Germany . |
| 3041973 | 8/1992 | Germany . |
| 2190371 | 11/1987 | United Kingdom . |
| 2210882 | 6/1989 | United Kingdom . |

OTHER PUBLICATIONS

"Toughening of High Strength Cementitious Matrix Reinforced by Discontinuous Short Fibers," by Chengsheng Ouyang and Surendra P. Shah, *Cement and Concrete Research*, vol. 22, pp. 1201–1215, 1992.

"Do Fibers Increase the Tensile Strength of Cement-Based Matrixes?", ACI Materials Journal, Title No. 88–M61, by Surendra P. Shah, Nov.–Dec. 1991, pp. 595–602.

"Fiber: Good for the Concrete Diet?" by William C. Panarese, Civil Engineering/May 1992, pp. 44–47.

"Mechanical Properties of High Performance Cement Binders Reinforced with Wollastonite Micro-Fibres," by Norman M. P. Low and J. J. Beaudoin, *Cement and Concrete Research*, vol. 22, pp.981–989, 1992.

Kosmatka et al., "Design and Control of Concrete Mixtures," Thirteenth Edition, PCA 1988, pp. 12–19.

International Search Report for PCT/US94/09922 and World Patent Index (WPAT) English Abstract of AN on Sheet 1.

*Primary Examiner*—Patrick Brinson
*Attorney, Agent, or Firm*—Gregory F. Wirzbicki; Alan H. Thompson

[57] ABSTRACT

Conduits having cement-containing liners for the inner and outer surfaces of metal pipes include a fibrous material, such as glass fibers, to prevent cracking and/or inhibit crack propagation.

27 Claims, No Drawings

GLASS FIBER REINFORCED CEMENT LINERS FOR PIPELINES AND CASINGS

RELATED APPLICATIONS

This application is a continuation-in-part application U.S. patent application Ser. No. 08/145,064, filed Oct. 29, 1993 now abandoned, the disclosure of which is incorporated by reference herein in its entirety.

BACKGROUND OF THE INVENTION

1. Field of the Invention

This invention relates to methods of lining pipes, and to pipes so lined, exposed to corrosive environments particularly to cement liners for metal pipe that carry corrosive fluids.

2. State of the Art

Cement is used to line pipes that are conduits for corrosive or otherwise hard to handle compositions. One class of such corrosive compositions that must be transported through pipes is geothermal brines and steam used to extract power from the earth. Although the cement used to line such pipes can be standard Portland cement used without any special additives, many special cements are used for this purpose. For example, U.S. Pat. No. 5,122,554, said patent incorporated by reference in full herein, describes enhanced polymer concrete compositions. Polymer cements have the disadvantage of being more costly to produce than cements hydrated with water (i.e., hydraulic cements). However, water hydrated cements are subject to cracking caused by dry shrinkage during manufacture and storage, mechanical jarring during fabrication into pipelines, and corrosion and erosion during use as pipelines. The cracks propagate until they penetrate through the cement liner and allow the corrosive contents of the pipe to contact the metal shell of the pipe, which, in turn, causes metal corrosion and the eventual failure of the pipe.

It would be advantageous to have a liner that was less costly to produce and did not crack or otherwise expose the supporting metal of the pipe to the corrosive contents of the pipeline.

SUMMARY OF THE INVENTION

A cement composition reinforced with micro fibers and/or macro fibers is used to line pipes. The pipes are typically lined with between about a ⅛ inch to ¾ inch layer of the cement mixture which normally contains a relatively high weight percentage of cement relative to the fibers and fine silica aggregate filler particles (i.e., <100 micron average particle sizes.) A typical lining cement composition contains between about 50 to 95 dry wt % cement, between about 1 to 10 dry wt % glass fibers, and 5 to 50 dry wt % silica aggregate. Preferably, the cement/silica/fiber liner is devoid of aggregate particles whose size distributions are commonly associated with sand. The pipes so lined are corrosion resistant, and, in particular, they are especially resistant to the corrosion caused by geothermal fluids.

The corrosion resistant pipes are made by adding enough water to a mixture of between 50 and 95 wt % cement, and between 10 and 50 wt % silica aggregate to form a homogenous slurry, adding glass fibers to the slurry and mixing the slurry with the added glass fibers until the glass fibers are evenly (or essentially homogenously) mixed throughout the slurry. The slurry is then placed in a metal pipe and distributed on either the interior or exterior surface of the pipe. Preferably, if the pipe is cylindrical, it is rapidly rotated around its axis to evenly distribute the slurry on the inside surface of the pipe.

The pipes made by this invention provide a conduit for containing corrosive liquids. The pipes comprise a metal shell, and a cement lining usually between about ⅛ inch and ¾ inch thick in the interior or on the exterior of the metal shell. If the pipe is cylindrical and has been rotated (spun), the glass fibers tend to form a stratum of high fiber concentration within the cement lining proximate the metal shell. Also, multiple spin cycles provide, for instance, ¼ inch thick lining layers, that produce multi-strata liners having low cracking propensities. Preferably, the metal shell is an elongate tube, and at least 30% of the glass fibers have their long dimension oriented within 30 degrees of the parallel to the longitudinal axis of the elongate tube.

DETAILED DESCRIPTION OF THE INVENTION

The cements useful in the present invention generally encompasses hydraulic cements including Portland type cements, such as type-K, and particularly the type identified by the American Petroleum Institute as type-G, a type of cement used primarily to finish oil, gas and geothermal wells. Such hydraulic cements have particle size distributions wherein the average particle size is less than 100 microns, and often less than 50 microns, and usually contains essentially all particles of size less than 100 microns. The ideal cement liner would have no change in dimension as it sets in the presence of water; however, cements tend to expand (e.g., type-K) or shrink (e.g., type-G) during curing. The cement layer includes a fibrous material making the cement more resistant to crack propagation, and the pipes are lined with this material to better resist corrosion and failure. The added fibers stop the propagation of cracks and the mitigation of large crack formation thereby promoting authengenic healing within the cement liner, particularly in liner compositions containing high cement contents and fine silica aggregate devoid of sand. Other cements that can be used in this invention include the quick setting high alumina-content non-Portland type cements or commercially available blends such as, e.g., Precrete. Polymer concretes can also be used.

Primarily because it expands as it cures, type-K cement is advantageously used as the cement in this invention. If the expansion of the curing cement is hindered, as it would be in the interior of a cylindrical pipe, any cracks that might have otherwise formed in a cement due to jarring or dry shrinkage, or other reasons, are squeezed out by the release of compressive strain resulting from the expansion of the cement upon cure. Although the added fibers tend to increase the compressive strength of type-K cement, they do not increase the compressive strength of type-G cement. However, type-G cement is useful in this invention because the fibers are instrumental in stopping the propagation of cracks in the cement, rather than providing added compressive strength.

In addition to cement, fibers, and, of course, added water, the compositions of this invention also include a filler containing non-fibrous aggregate. The preferred non-fibrous aggregate used in the cement of the present invention is a silica aggregate, such as silica flour or other fine silica product such as Imsil, and/or pozzolana materials. It is highly preferred that the non-cementitious, non-fibrous aggregate contained in the composition is essentially devoid of particle size distributions having an average particle size greater than 100 microns, as for example, sand. (As used herein, "sand" contains non-cementitious, non-fibrous silica-containing aggregate particles having an average particle size greater than 100 microns.) The silica aggregate does not hydrate when the cement slurry is formed and comprises between about 85 wt % and 100 wt % silica particles ($SiO_2$) ranging from about 1 to less than 100 microns, with a preferred distribution having a median or average particle size from about 3 to about 75 microns. A typical mixture comprises 10% particles smaller than 3.2 microns, 50% smaller than 18.4 microns, and 90% smaller than 61.8 microns. The silica aggregate provides added resistance to carbonation to the mixture. Silica aggregate particles are rough, having sharp edges.

Although cement can make up the entire non-fibrous solid portion of the liner, the mixture of cement and silica aggregate filler is normally at least about 3 parts cement to 7 parts silica aggregate, preferably at least 1 part cement to 1 part silica aggregate, and most preferably at least 2 parts cement to 1 part silica aggregate, calculated on a dry weight basis. In other words, the cement/filler mixture normally contains at least 30 weight percent cement, preferably at least 50 weight percent cement, and most preferably at least 65 weight percent cement; however, in the case of type-G or type-K cement, it is preferred that at least 70 weight percent (for chemical stability) and at least 85 weight percent cement (for compressive strength) be included, relative to the silica aggregate, particularly the fine silica aggregate. Between about one-half part and two parts, preferably between about three-quarters of a part and one and one quarter part, of silica aggregate is added to three parts of type-G cement, the parts measured as dry weight and the two ingredients thoroughly mixed together as dry powders. Ordinarily, the dry mixture of cement and aggregate is wetted with added water to make an aqueous cement or cement/filler slurry. Although they may be added to the mixture at any stage, the fibers are preferably added to the aqueous cement/filler slurry. The added water initiates the hydration of the cement, and during the course of the curing a fully hydratable quantity of water is provided.

Preferred fibers can be either micro fibers or macro fibers. Micro fibers have a diameter between about 10 $\mu$ and 70 $\mu$ and an aspect ratio (the ratio of length to diameter) between about 5 and 20 to 1. Macro fibers, such as glass fibers and fiber bundles, have a diameter between about 10 $\mu$ and 200 $\mu$ and an aspect ratio between about 20 and 500 to 1, preferably, greater than 100. The ranges of dimensions for micro fibers and macro fibers as defined above are relative and overlap because any type or batch of fibrous material will contain a wide range of overall sizes of particles. However, micro fibers will have a median diameter of between about 1 $\mu$ and 100 $\mu$, and aspect ratios less than 100, and the macro fibers will have a median diameter between about 1 $\mu$ and 275 $\mu$ and an aspect ratio of greater than 100. Preferred micro fibers include, e.g., Wollastonite ($CaO \cdot SiO_2$) and preferred macro fibers include glass fibers. Although less preferred, other fibers having approximately the same dimensions, for example, metal fibers, preferably metal fibers that resist corrosion such as titanium fibers, fibrous minerals, for example asbestos, and other fibers, such as graphite fibers, can also be used in the compositions of this invention. Preferred fibers will not hydrate in the slurry. The preferred macro fibers are fine glass fibers joined together into bundles of many parallel fibers. The bundles may contain in excess of 50 individual fibers and, during manufacture, are cropped to any desired length, but usually the length is between about 3 mm (approx. ⅛ in.) and 12 mm (approx. ½ in.). The preferred size is approximately 6 mm having an aspect ratio for the bundle of between about 10:1 and 25:1. Sources of fibers meeting these specifications are, for the glass fibers, Chem-Fil Ltd.; Merseyside, England, U.K., and Thalco; City of Commerce, Calif., U.S.A, and for the Wollastonite, Prescott & Co.; Mississaugo, Ont., Canada. These fibers are added to the premixed slurry.

Although the fibers can be added at any time during the formulation of the cement, it is greatly preferred to add them to the cement-containing slurry after the slurry has been premixed for between about 2 and 5 minutes. An amount between about 0.5 wt % and 10 wt %, the preferred amount being between about 1 wt % and 8 wt %, with about 1.5 to about 6 wt % being the most preferred, of fibers are added to the cement mixture, when the wt % is based on the weights of the total dry materials, i.e., dry cement and filler. A highly preferred concentration of the most preferred fibers is about 1.0 to about 4 wt % of 6 mm fibers. Higher concentrations of fibers, particularly higher concentrations of macro fibers, tend to result in the fibers clumping together in the slurry. This clumping creates a hard-to-handle slurry. Furthermore, the compaction benefit resulting from spin casting seems to taper off for fiber concentrations greater than about 15 wt %, and more often greater than 10 wt % (relative to the total dry materials). Although the lining compositions described herein may contain only micro fibers, in most cases it is preferred that the micro fibers be added to the slurry in up to the same concentrations as the macro fibers.

Although the invention is not bound by any particular theory of operation, it is now believed that, among other functions, the fibers help to distribute the stresses induced by the volume change of the hydrated cement as it cures. Shrinking can occur with non-expansive cements, typically occurring during the curing phase and varying with the cement used, the amount of water used in the cement slurry, and the extent of post cure drying. Shrinkage even occurs with expansive cements, particularly if the cement is allowed to completely dry in the post curing phase. Furthermore, cracks introduced from rough handling during storage and shipping are mitigated from propagating by the addition of the micro fibers.

Enough slurry is placed into or on the pipe to cover the surface of the pipe with an average radial thickness between about ⅛ inch and ¾ inch, preferably between ¼ inch and ½ inch, compacted cement-containing mixture. If the pipe is cylindrical, and the surface to be covered is the interior surface, the pipe can be rapidly rotated around its longitudinal axis to distribute the slurry evenly throughout the interior of the pipe. In the case of the rotated pipe, the pipe is preferably rotated rapidly enough to generate a force greater than 1 G (where G is the force of gravity at the surface of the earth), preferably greater than 5 G, and preferably greater than 10 G at the interior surface of the pipe. In some instances, the force of gravity is less 20 G at the interior surface of the pipe; however, the interior force can also be as great as 20 to 200 G, with excellent results achieved above about 50 G. If the pipe is of some other configuration than cylindrical, the slurry can be spread by other conventional cement spreading and/or compacting means and left to cure.

The pipe joints and conduit made joining the pipe joints made by the method of this invention is characterized by an outer shell, preferably a metal shell, usually a steel pipe, with a cementitious layer lining the inside surface of the pipe. If the pipe is prepared by the rotating method outlined above the fibers added to the cement may form a stratum proximate the metal shell. The fibers of the spun pipes tend to lie parallel to a local plane defined by extending radii from the axis of the pipe to the liner, the angle between the radii not exceeding about 5 degrees. Although aligned not essentially planar, the fibers will be aligned to within about 30 degrees of the longitudinal axis of the pipe. At least 30%, preferably 50%, and most preferably more than 60%, of the fibers in the stratum will be aligned to within about 30% of the longitudinal axis of the pipe.

Normally, liner matrix materials containing high concentrations of fine cement and/or filler materials (other than sand) result in excessive cracking of the liners, particularly when uncompacted. It has been discovered in the present invention that the above-described fibers, when used in the presence of combinations of cement with the relatively small silica aggregate particles, particularly silica flour, significantly contribute to the preparation of a homogeneous and/or isotropic cement/aggregate liner matrix material (which further assists in crack mitigation). Such a liner matrix, of relatively small fine particles, particularly in the presence of relatively high concentrations of cement, results in surprisingly low incidents of cracking.

The invention is further described by the following example, which is illustrative of various aspects of the invention and is not intended as limiting the scope of the invention as defined by the appended claims.

EXAMPLE

This example shows the use of the present invention to make several casing joints which were compared to joints made with conventional non-fibrous cements.

The cement was made by mixing 100 pounds of type-G cement with about 40 pounds of silica aggregate (silica flour) and mixing batches using a paddle mixer. Six batches were made, and fibers were added to the slurry in a) one pound, b) one and one half pound, and c) three pound amounts in the 6 mm length and a second three batches using the same weights of fibers in the 12 mm length. Each batch of fibers was added after the slurry had been mixed for about two minutes. It was seen that the 3% fibers concentrations tended to form clumps and cause difficulties with the fabrication equipment. Enough of a batch of cement was placed into metal conduit to produce between a ¼ inch and ⅝ inch lining. The resulting pipe section joints produced were stored for three to four weeks before installation. Then the joints were inspected by inserting a video camera down into the pipes. The video image showed significantly fewer cracks for the fibrous lined pipes than for similar pipes made with conventional, non-fibrous cement mortars.

The joints were then placed into use at a geothermal brine production well and a geothermal brine injection well near the bottom of both well strings to test the most severe environment in both wells.

The preliminary analysis of the cement liners indicated that fiber concentrations greater than about 1 wt % seemed to interfere with the ability of the cement to bond with the metal liner. This is considered to be a rheology problem which allows the fibers to concentrate at or near the pipe/liner interface. The video inspection of the pipes indicated that fewer cracks had formed than would be expected for conventional pipes similarly lined. Visual microscopic analysis of small sections of the liner indicated that the fibers in the rotated liners are concentrated near the metal-to-liner junction, with a very high local loading of fibers, the local loading frequently being greater than 6%.

Although this invention has been primarily described in terms of a specific example and embodiments thereof, it is evident that the foregoing description will suggest many alternatives, modifications, and variations to those of ordinary skill in the art. Accordingly, the appended claims are intended to embrace as being within the spirit and scope of invention all such alternatives, modifications, and variations.

What is claimed is:

1. A conduit for containing corrosive liquids comprising: an outer metal shell; and
a cement-containing spun lining attached to the interior surface of the shell, said lining comprising hydrated cement, at least some fibers, essentially no sand, and at least 50 dry weight percent of cement.

2. The conduit of claim 1 wherein the outer metal shell is cylindrical and the cement lining comprises about 50 to about 95 wt % cement, between about 0.5 to 10 dry wt % glass fibers, and between 5 and 50 wt % silica flour.

3. The conduit of claim 1 wherein the conduit contains glass fibers having a diameter and a long dimension forming a stratum within the cement-containing lining proximate the metal shell, at least 30 dry weight percent of the glass fibers having their long dimension oriented substantially parallel to the longitudinal axis of the metal shell.

4. The conduit of claim 1 wherein the cement is cured type-G cement.

5. The conduit of claim 1 wherein the cement is cured type-K cement.

6. The conduit of claim 1 wherein the cement-containing lining is between about ⅛ inch and ¾ inch thick.

7. The conduit of claim 6 wherein the cement-containing lining is prepared by centrifugal rotation of the metal shell at a force above 1 G.

8. The conduit of claim 1 wherein the conduit contains fibers having a diameter and a long dimension at least 2 strata within the cement-containing lining, each strata having at least 30 dry weight percent of the glass fiber concentration having their long dimension oriented substantially parallel to the longitudinal axis of the metal shell.

9. The conduit of claim 1 wherein said lining comprises about 0.5 to about 10 weight percent of said fibers, calculated on a dry weight basis.

10. The conduit of claim 1 further comprising between 5 and 50 weight percent of silica aggregate filler particles having an average particle size less than 100 microns.

11. The conduit of claim 10 wherein said silica aggregate particles consist essentially of particle sizes between about 1 and 100 microns.

12. The conduit of claim 1 wherein said fibers comprise no more than 1 weight percent macro fibers and comprise bundles of fine glass fibers having a median diameter no greater than 275 $\mu$.

13. The conduit of claim 1 wherein said fibers comprise Wollastonite.

14. The conduit of claim 1 wherein said fibers comprise bundles of glass fibers having a length between 3 and 20 mm.

15. The conduit of claim 11 wherein said lining consists essentially of a fully hydrated cement, said fibers and said filler.

16. The conduit of claim 1 wherein said lining comprising at least 65 weight percent of a cement selected from the group consisting of Type-K cement and Type-G cement.

17. The conduit of claim 1 wherein said lining comprises at least 1 weight percent of fibers selected from the group consisting of macro fibers and micro fibers.

18. The conduit of claim 1 wherein said fibers have a median aspect ratio greater than 100:1.

19. A conduit for containing geothermal fluids comprising:

an outer metal pipe; and a cement-containing spun lining attached to the interior surface of the pipe, said spun lining comprising at least 30 weight percent of a hydrated cement and between about 0.5 and 10 weight percent fibers, calculated on a dry weight basis, and essentially no sand, and wherein said lining has an average thickness of no more than about 1 inch.

20. The conduit of claim 19 further comprising silica aggregate filler particles having an average particle size less than 100 microns.

21. The conduit of claim 20 wherein the filler particles consist essentially of particle sizes between about 1 and 100 microns.

22. The conduit of claim 19 wherein the cement comprises a cured type-K cement.

23. The conduit of claim 19 wherein the cement comprises a cured type-K cement.

24. The conduit of claim 19 wherein the macro fibers comprise no more than 1 weight percent and consist of bundles of fine glass fibers having a median diameter no greater than 275 μ.

25. The conduit of claim 19 wherein the fibers comprise Wollastonite.

26. The conduit of claim 19 wherein the fibers comprise bundles of glass fibers having a long dimension between 3 and 20 mm.

27. The conduit of claim 20 consisting essentially of said hydrated cement, said fibers and said filler particles.

* * * * *

UNITED STATES PATENT AND TRADEMARK OFFICE
CERTIFICATE OF CORRECTION

PATENT NO. : 5,649,568
DATED : July 22, 1997
INVENTOR(S) : William C. Allen, David E. Stikkers and Daniel P. Hoyer It is certified that error appears in the above-indentified patent and that said Letters Patent is hereby corrected as shown below:

Column 6, claim 16, line 59, after the word "from" delete ".".

Column 7, claim 22, line 16, replace "type-K" with -- type-G --.

Signed and Sealed this

Eleventh Day of August 1998

Attest:

BRUCE LEHMAN

Attesting Officer        Commissioner of Patents and Trademarks